United States Patent
Zhou (10) Patent No.: US 12,026,618 B2
(45) Date of Patent: **\*Jul. 2, 2024**

(54) METHOD AND SYSTEM FOR TRAINING MACHINE LEARNING SYSTEM

(71) Applicant: ALIBABA GROUP HOLDING LIMITED, Grand Cayman (KY)

(72) Inventor: Jun Zhou, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,204

(22) Filed: Jun. 27, 2023

(65) Prior Publication Data

US 2023/0342607 A1    Oct. 26, 2023

Related U.S. Application Data (63) Continuation of application No. 16/114,078, filed on Aug. 27, 2018, now Pat. No. 11,720,787, which is a
(Continued)

(30) Foreign Application Priority Data

Feb. 29, 2016    (CN) .......................... 201610113716.1

(51) Int. Cl.
*G06N 3/08*    (2023.01)
*G06F 17/11*    (2006.01)
(Continued)

(52) U.S. Cl.
CPC .............. *G06N 3/08* (2013.01); *G06F 17/11* (2013.01); *G06F 17/16* (2013.01); *G06F 18/2148* (2023.01); *G06N 20/00* (2019.01)

(58) Field of Classification Search
CPC ...... G06N 3/08; G06N 20/00; G06F 18/2148; G06F 17/11; G06F 17/16
See application file for complete search history.

(56) References Cited

U.S. PATENT DOCUMENTS

| | | | |
|---|---|---|---|
| 8,706,742 B1 * | 4/2014 | Ravid | G06N 5/04 707/740 |
| 2009/0092313 A1 * | 4/2009 | Negi | G06F 18/214 382/160 |

(Continued)

FOREIGN PATENT DOCUMENTS

| | | |
|---|---|---|
| CN | 101968851 A | 2/2011 |
| CN | 102156907 A | 8/2011 |

(Continued)

OTHER PUBLICATIONS

Notice of Reasons for Rejection issued by Japanese Patent Office in corresponding with Japanese Application No. JP 2018-544075, mailed Mar. 29, 2021 (6 pages).
(Continued)

*Primary Examiner* — Qun Shen
(74) *Attorney, Agent, or Firm* — Finnegan, Henderson, Farabow, Garrett & Dunner, LLP (57) ABSTRACT

The present disclosure provides a method and a system for training a machine learning system. Multiple pieces of sample data are used for training the machine learning system. The method includes acquiring multiple sample sets, each sample set including sample data in a corresponding sampling time period; setting a sampling rate for each sample set according to the corresponding sampling time period; acquiring multiple sample sets sampled according to set sampling rates; determining importance values of the multiple sampled sample sets; correcting each piece of sample data in the multiple sampled sample sets by using a corresponding importance value to obtain corrected sample
(Continued)

data; and inputting the corrected sample data into the machine learning system to train the machine learning system.

18 Claims, 6 Drawing Sheets

Related U.S. Application Data continuation of application No. PCT/CN2017/073719, filed on Feb. 16, 2017.

(51) Int. Cl.
*G06F 17/16* (2006.01)
*G06F 18/214* (2023.01)
*G06N 20/00* (2019.01)

(56) References Cited

U.S. PATENT DOCUMENTS

| | | |
|---|---|---|
| 2010/0005043 A1 | 1/2010 | Yamashita et al. |
| 2010/0137166 A1* | 6/2010 | Kain .................... C12Q 1/6874 506/39 |
| 2012/0041574 A1* | 2/2012 | Hsiung ............ G05B 19/41875 700/47 |
| 2012/0209612 A1 | 8/2012 | Bilobrov |
| 2014/0079297 A1* | 3/2014 | Tadayon ............... G06V 40/172 382/118 |
| 2015/0195145 A1* | 7/2015 | Di Pietro ................ G06N 20/00 706/12 |
| 2016/0110643 A1* | 4/2016 | Basu ........................ G06F 17/16 706/22 |
| 2016/0224803 A1* | 8/2016 | Frank .................. G06F 21/6245 |

FOREIGN PATENT DOCUMENTS

| | | |
|---|---|---|
| CN | 103136361 A | 6/2013 |
| CN | 104166668 A | 11/2014 |
| JP | 2009-093250 A | 4/2009 |
| JP | 2014-016895 A | 1/2014 |
| JP | 2014016859 | 1/2014 |
| WO | WO2008/072459 | 6/2008 |
| WO | WO 2017/148266 A1 | 9/2017 |

OTHER PUBLICATIONS

SIPO International Search Report issued in International Application No. PCT/CN2017/073719, mailed Apr. 26, 2017 (4 pages).

* cited by examiner

METHOD AND SYSTEM FOR TRAINING MACHINE LEARNING SYSTEM

CROSS-REFERENCE TO RELATED APPLICATION

This application is a continuation of application Ser. No. 16/114,078, filed Aug. 27, 2018, which is a continuation of International Application No. PCT/CN2017/073719, filed on Feb. 16, 2017, which is based upon and claims priority to Chinese Patent Application No. 201610113716.1, filed on Feb. 29, 2016, all of which are incorporated herein by reference in their entireties.

TECHNICAL FIELD

The present disclosure relates to the field of big data processing, and in particular, to a method and a system for training a machine learning system.

BACKGROUND

In the current big data era, it is very easy for an Internet company to acquire hyper-scale data. According to incomplete statistics, Google had 3 billion queries/30 billion advertisements every day in 2012, Facebook users shared 4.3 billion pieces of content every day in 2013, and Alibaba had more than 0.7 billion transactions on the day of Double Eleven in 2015. These companies use a machine learning system to mine data, including user interests/behaviors/habits, and the like.

A machine learning system is designed as a neural network imitating a human brain to predict behaviors of users. A machine learning system needs to be trained by using a large scale of data before being launched. However, during the training, a large amount of machine resources must be used to effectively process the large scale of data. For example, advertisement data of Tencent generally amounts to petabytes of data, and more than a thousand machines must be used, which is a huge cost for most companies.

A common processing manner is reducing the data amount processed by a machine leaning system by means of random sampling, in order to reduce the cost and improve the efficiency of the machine learning system. The random sampling refers to discarding samples at a certain probability. For example, a floating number in a range of 0-1 is generated for each sample, and the sample is discarded if the floating number is greater than a threshold. However, the manner of randomly discarding samples leads to a large amount of useful data being discarded, thus diminishing the training performance of the machine learning system and reducing the prediction precision.

SUMMARY

In view of the above problems, embodiments of the present disclosure are proposed to provide a method and a system for training a machine learning system that can address the above problems or at least partially solve the above problems.

In accordance with some embodiments of the present disclosure, there is provided a method for training a machine learning system, where multiple pieces of sample data are used to train the machine learning system. The method includes acquiring multiple sample sets. Each sample set of the multiple sample sets includes sample data in a corresponding sampling time period. The method includes setting a sampling rate for each sample set according to the corresponding sampling time period. The method includes acquiring multiple sample sets sampled according to set sampling rates. The method includes determining importance values of the multiple sampled sample sets. The method includes correcting all pieces of sample data in the multiple sampled sample sets by using the importance values corresponding to the sampled sample sets to obtain corrected sample data. The method includes inputting each piece of the corrected sample data into the machine learning system to train the machine learning system.

In accordance with some embodiments of the present disclosure, there is provided a system for training a machine learning system, where multiple pieces of sample data are used to train the machine learning system. The system includes one or more memories configured to store executable program code and one or more processors configured to read the executable program code stored in the one or more memories to cause the system to perform a method. The method includes acquiring multiple sample sets, where each sample set of the multiple sample sets includes sample data in a corresponding sampling time period. The method includes setting a sampling rate for each sample set according to the corresponding sampling time period. The method includes acquiring multiple sample sets sampled according to set sampling rates. The method includes determining importance values of the multiple sampled sample sets. The method includes correcting each piece of sample data in the multiple sampled sample sets by using a corresponding importance value to obtain corrected sample data. The method includes inputting each piece of the corrected sample data into the machine learning system to train the machine learning system.

In accordance with some embodiments of the present disclosure, there is provided a non-transitory computer-readable storage medium storing a set of instructions that is executable by one or more processors of an electronic device to cause the electronic device to perform a method. The method includes acquiring multiple sample sets. Each sample set of the multiple sample sets includes sample data in a corresponding sampling time period. The method includes setting a sampling rate for each sample set according to the corresponding sampling time period. The method includes acquiring multiple sample sets sampled according to set sampling rates. The method includes determining importance values of the multiple sampled sample sets. The method includes correcting all pieces of sample data in the multiple sampled sample sets by using the importance values corresponding to the sampled sample sets to obtain corrected sample data. The method includes inputting each piece of the corrected sample data into the machine learning system to train the machine learning system.

The embodiments of the present disclosure can have the following advantages. The embodiments of the present disclosure disclose a method and a system for training a machine learning system. Sample data is processed before being inputted into the machine learning system. Sample sets divided according to sampling time periods are acquired. A sampling rate of each sample set is set according to the sampling time periods. Sampling is conducted according to sampling rates. Importance values of the sampled sample sets are determined. The sample data is corrected by using the importance values. The sample data is inputted into the machine learning system for training. The adoption rate and the utilization of important data can be guaranteed while the data amount processed by the machine learning system is reduced. The impact on the learning performance of the machine learning system can be reduced while the demand for memory resources is lessened.

DETAILED DESCRIPTION

The technical solutions in the embodiments of the present disclosure will be described below through the accompanying drawings depicting the embodiments of the present disclosure. Apparently, the described embodiments are merely a part, rather than all, of the embodiments of the present disclosure. Based on the embodiments of the present disclosure, all other embodiments derived by those of ordinary skill in the art shall fall within the protection scope of the present disclosure.

One of the core ideas of the present disclosure lies in that a method and a system for training a machine learning system are proposed. Multiple pieces of sample data are used to train the machine learning system. The method includes: dividing sample data into multiple sample sets according to sampling time periods of the sample data; setting a sampling rate for each sample set according to the sampling time period corresponding to each sample set; sampling each sample set according to the corresponding sampling rate, and modifying an importance value corresponding to each sampled sample set; correcting each piece of sample data by using the importance values, and inputting the corrected sample data into the machine learning system to train the machine learning system.

Figure 1:
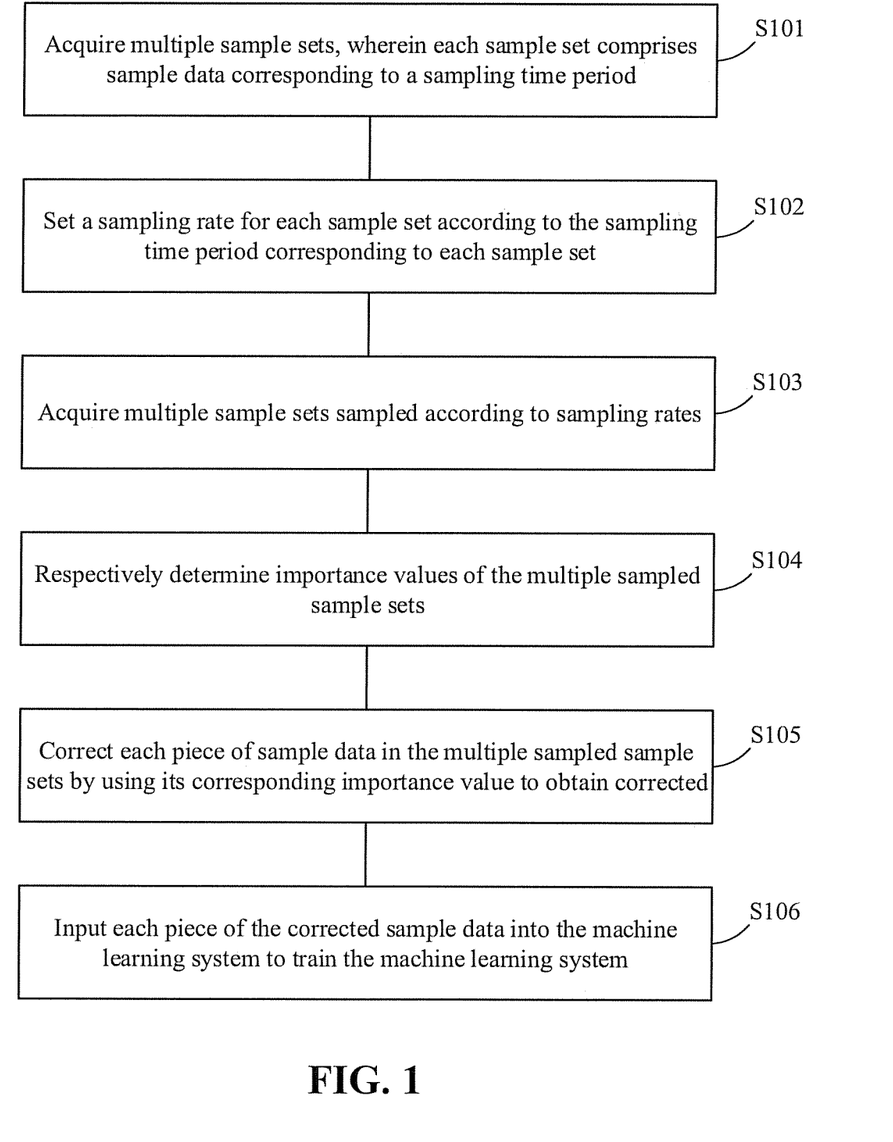
FIG. 1 is a flowchart of an exemplary method for training a machine learning system according to some embodiments of the present disclosure.

According to some embodiments of the present disclosure, there is provided a method for training a machine learning system. FIG. 1 shows a flowchart of an exemplary method for training a machine learning system according to some embodiments of the present disclosure. The method for training a machine learning system provided in these embodiments can include steps S101-S106 as follows.

In step S101, multiple sample sets are acquired. Each sample set includes sample data corresponding to a sampling time period. In this step, each piece of sample data is, for example, a vector. A dimension of the vector is, for example, a sampling time of the sample data. In this step, the sampling time of all the sample data may be divided into multiple sampling time periods. The multiple pieces of sample data are divided into multiple sample sets according to the sampling time periods. Each sample set corresponds to a sampling time period.

For example, a sampling time including all sample data is from January 24 to January 29. The sampling time may be divided into multiple sampling time periods, for example, three sampling time periods including January 29, January 27 to January 28, and January 24 to January 26. According to the above three sampling time periods, the sample data is divided into a sample set sampled on January 29, a sample data set sampled from January 27 to January 28, and a sample set sampled from January 24 to January 26. Therefore, each sample set corresponds to a sampling time period.

It is noted that the sampling time periods may be divided according to a rule set by a developer or a user, and may be distributed evenly or unevenly. These are not limiting in the present disclosure.

In step S102, a sampling rate is set for each sample set according to the sampling time period corresponding to each sample set. In this step, a sampling rate of each sample set may be set according to a corresponding sampling time period. For example, the sampling rate may be set according to a principle that a sample set having a more recent sampling time period corresponds to a higher sampling rate. That is, the sampling rate is set higher for a sample set corresponding to a later sampling time period than the sampling rate of a sample set corresponding to an earlier sampling time period. For example, in the above example, the sampling rate of the sample set corresponding to the sample data sampled on January 29 may be set to 1.0. The sampling rate of the sample set corresponding to the sample data sampled from January 27 to January 28 may be set to 0.5. The sampling rate of the sample set corresponding to the sample data sampled from January 24 to January 26 may be set to 0.1.

In step S103, multiple sample sets sampled according to sampling rates are acquired. In this step, sample data in each sample set may be sampled according to the sampling rate set in the above step. For example, a sample set includes 1000 pieces of sample data, and a sampling rate is 0.1. Then, the number of pieces of sampling data included in the sampled sample set is 1000*0.1=100. After the sampling, there are 100 pieces of sample data in the sample set. A set corresponding to the 100 pieces of sample data may be referred to as a sampled sample set.

In step S104, importance values of the multiple sampled sample sets are determined respectively. In some embodiments, the importance value may be a coefficient set manually or by a machine algorithm. The importance value corresponding to each sampled sample set may be set manually or set by a machine according to a certain rule. In this step, a new importance value may be set on the basis of the original importance value of the sample set.

In step S105, pieces of sample data in the multiple sampled sample sets are corrected by using the importance values to obtain corrected sample data. In this step, each piece of sample data in a sampled sample set may be corrected by using an importance value corresponding to the sampled sample set to obtain corrected sample data.

Correcting each piece of sample data by using the importance value may involve multiplying each feature dimension of each vector by the importance value, such that the vector is magnified proportionally to obtain the corrected sample data.

For example, an original or default importance value of a sample set is 1 and can be corrected to 2 in this step. Therefore, a piece of sample data originally being a (1, 1, 1, 2, . . . , n) may be corrected to a (2, 2, 2, 4, . . . , 2n), which is corrected sample data.

However, it is appreciated that the importance value is not limited to a coefficient set manually or using a machine algorithm. In some embodiments, there may be various methods for correcting the samples. For example, a mathematical operation may be performed on the sample data a (1, 1, 1, 2, ..., n), a1=f(a), and the like. Here, function f may include a mathematical function such as a geometric multiplication function, an exponential calculation, or the like.

In step S106, each piece of the corrected sample data is input into the machine learning system to train the machine learning system. In this step, the corrected sample data may be input into the machine learning system to train the machine learning system. During training, the derivative of a loss function is taken to calculate a gradient. Then, a weight close to the optimal solution may be calculated through iteration based on the gradient, an initial weight, and a set step length according to the formula "new weight=old weight+step length*gradient."

In summary, these embodiments disclose a method for training a machine learning system. The sample data is processed before being input into the machine learning system. The adoption rate and the utilization of important data can be improved while the data amount is reduced. Thus, the impact on the learning performance of the machine learning system can be reduced while the demand for memory resources is lessened.

Figure 2:
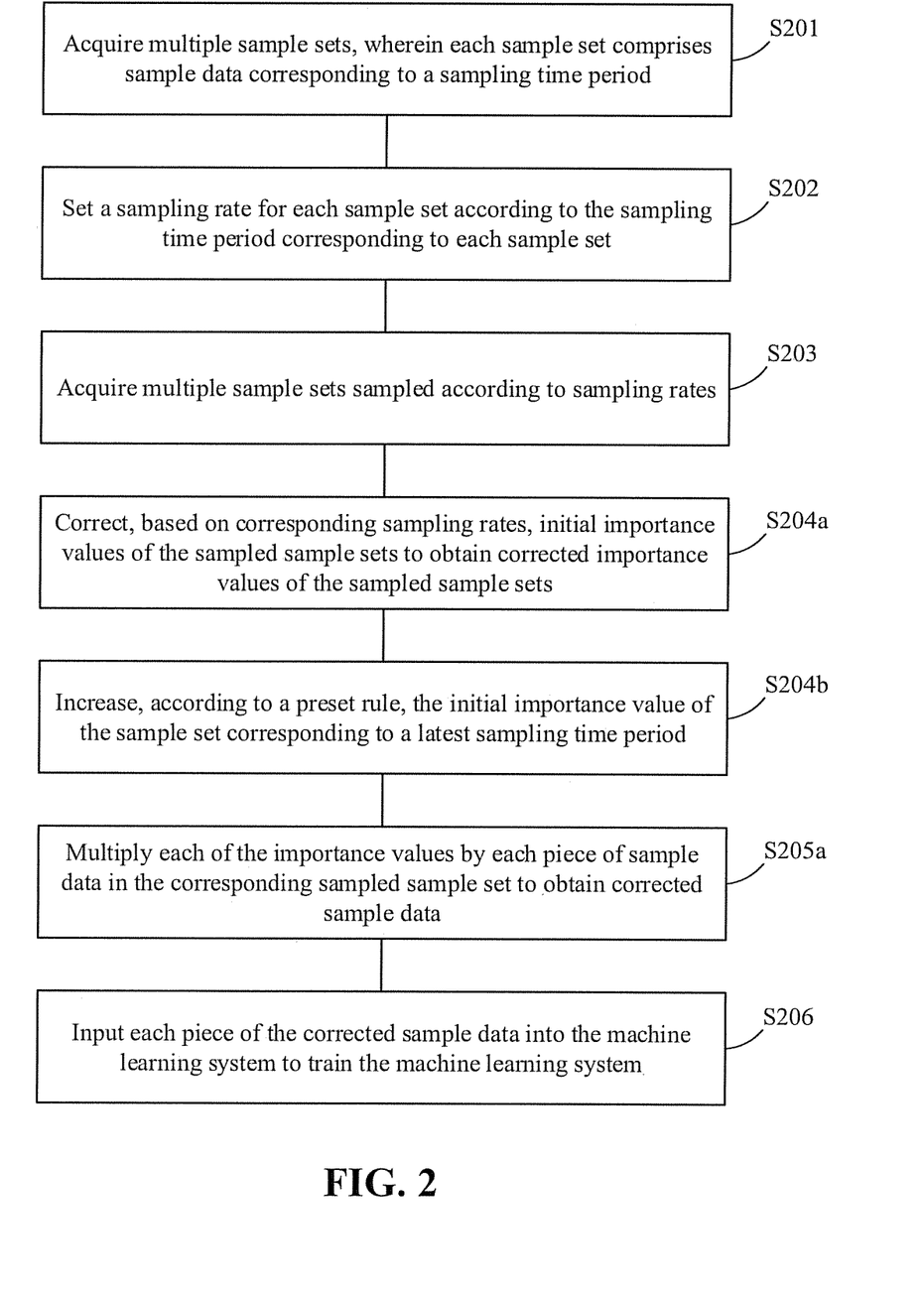
FIG. 2 is a flowchart of an exemplary method for training a machine learning system according to some embodiments of the present disclosure.

According to some embodiments of the present disclosure, there is provided another method for training a machine learning system. FIG. 2 shows a flowchart of an exemplary method for training a machine learning system according to some embodiments of the present disclosure. The method for training a machine learning system provided in these embodiments can include steps S201-S206.

In step S201, multiple sample sets are acquired. Each sample set includes sample data corresponding to a sampling time period.

In step S202, a sampling rate is set for each sample set according to the sampling time period corresponding to each sample set.

In step S203, multiple sample sets sampled according to sampling rates are acquired.

The above three steps are identical or similar to steps S101, S102, and S103 described above, and are not repeated in detail here.

In step S204, importance values of the multiple sampled sample sets are determined respectively.

For example, step S204 may include sub-step S204*a* as follows.

In sub-step S204*a*, initial importance values of the sampled sample sets are corrected based on corresponding sampling rates to obtain corrected importance values of the sampled sample sets. A corrected importance value can be directly proportional to an initial importance value, and inversely proportional to the sampling rate of the sampled sample set.

In sub-step S204*a*, for example, a new importance value may be calculated based on a ratio of the original corresponding importance value of the sample set to the sampling rate. For example, an importance value of each sample set may be set initially according to the following formula:

$$Y1=Y/a;$$

wherein Y1 is a set importance value corresponding to the sample set; Y is an original importance value corresponding to the sample set; and a is a sampling rate of the sample set.

For example, as described in the example above, the sampling rate for the sampling time period from January 24 to January 26 is 0.1, and the importance value corresponding to the set is set to 0.2; the sampling rate for the sampling time period of January 29 is 0.5, and the importance value corresponding to the set is set to 1; and the sampling rate for the sampling time period from January 27 to January 28 is 1, and the importance value corresponding to the set is set to 5. Then, according to Y1=Y/a, it can be obtained that importance values of the three sets arranged according to the sampling time periods chronologically are 2, 2, and 5 respectively.

For example, step S204 may further include sub-step S204*b* as follows.

In sub-step S204*b*, the importance value of the sample set corresponding to the latest sampling time period is increased according to a preset rule.

In sub-step S204*b*, for example, the preset rule may include increasing the importance value of the sample set corresponding to the latest sampling time period so that it can be directly proportional to the importance value of the sample set corresponding to the latest sampling time period before the increase and directly proportional to the total number of the sample sets.

In this sub-step, for example, the importance value of the sample set corresponding to the latest sampling time period may be re-set according to the following formula:

$$Z1=Z*b;$$

wherein Z1 is a re-modified importance value corresponding to the sample set; Z is an initially modified importance value corresponding to the sample set; and b is the total number of the sample sets.

For example, it can be obtained according to sub-step S204*b* that the importance values of the three sets arranged according to the sampling time periods chronologically are 2, 2, and 5 respectively. Here, the importance value of the sampled sample set having the latest sampling time period, i.e., the third sample set, may be further increased.

For example, the importance value of the sample set corresponding to the latest sampling time period may be re-set according to the following formula:

$$Z1=Z*b;$$

wherein Z1 is a re-set importance value corresponding to the sample set; Z is an initially set importance value corresponding to the sample set; and b is the total number of the sample sets.

For example, the initially set importance value corresponding to the sample set having the latest sampling time period obtained in sub-step S204*a* is 5. In this sub-step, according to the formula Z1=Z*b, the re-set importance value 5*3=15 may be acquired.

It is noted that, sub-step S204*b* may be performed before or after sub-step S204*a*, or the two sub-steps may be performed independently. For example, sub-step S204*b* can be independent of sub-step S204*a* and performed without sub-step 204*a*.

In step S205, pieces of sample data in the multiple sampled sample sets are corrected by using the importance values to obtain corrected sample data.

For example, this step may include sub-step S205*a* as follows.

In sub-step S205*a*, each of the importance values is multiplied by each piece of sample data in a sampled sample set corresponding to the important value to obtain corrected sample data.

In step S206, each piece of the corrected sample data is input into the machine learning system to train the machine learning system.

The step may be identical or similar to step S106 described above, and is not repeated in detail here.

In summary, these embodiments of the present disclosure as exemplified in FIG. 2 disclose a method for training a machine learning system. The sample data is processed before being input into the machine learning system, and importance values of different sample sets are set. Therefore, the adoption rate and the utilization of important data can be improved while the data amount is reduced. The impact on the learning performance of the machine learning system can be reduced while the demand for memory resources is lessened.

Figure 3:
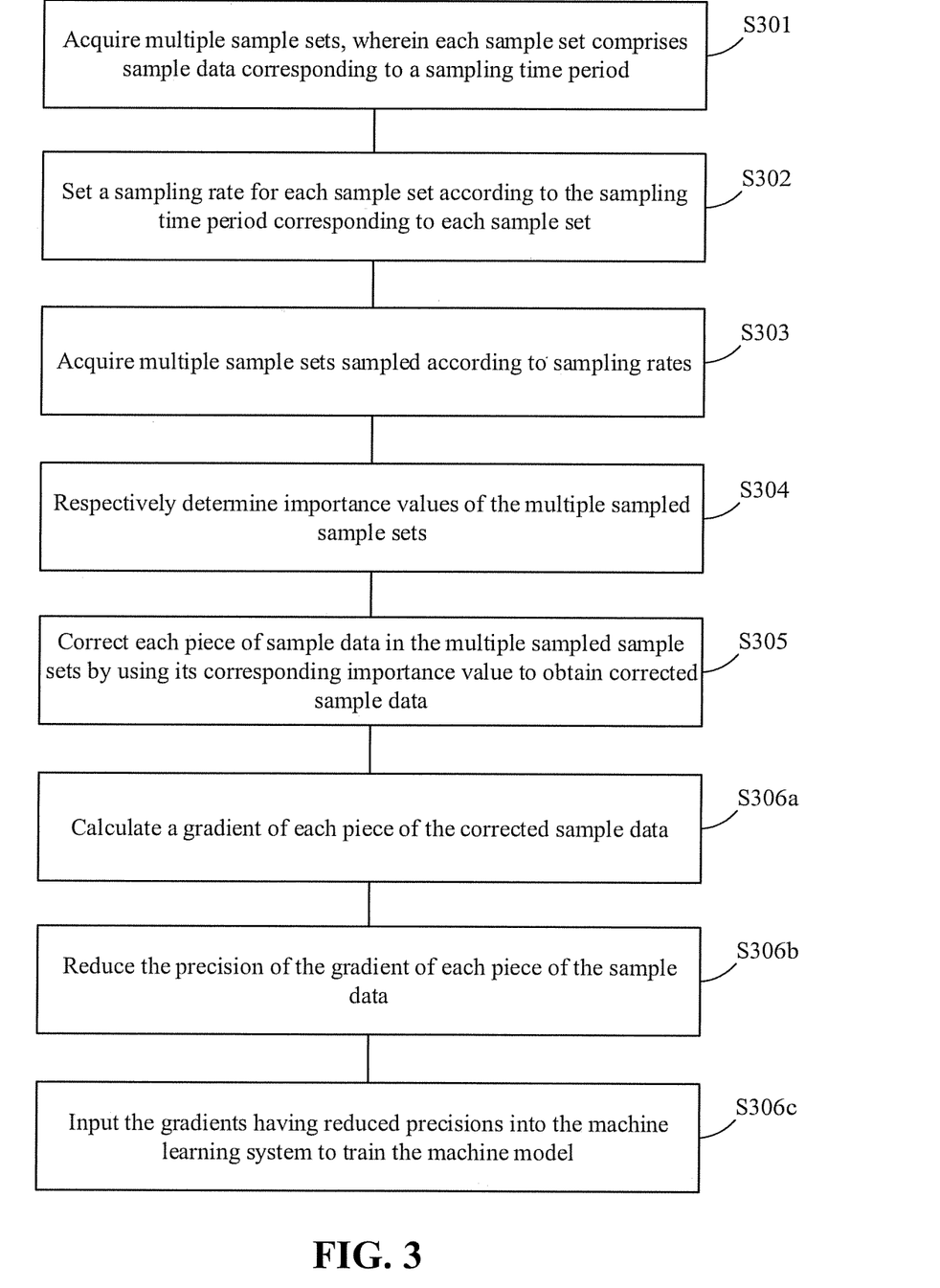
FIG. 3 is a flowchart of an exemplary method for training a machine learning system according to some embodiments of the present disclosure.

According to some embodiments of the present disclosure, there is provided yet another method for training a machine learning system. FIG. 3 shows a flowchart of an exemplary method for training a machine learning system according to some embodiments of the present disclosure. The method for training a machine learning system provided in these embodiments can include steps S301-S306c as follows.

In step S301, multiple sample sets are acquired. Each sample set includes sample data corresponding to a sampling time period.

In step S302, a sampling rate for a sample set is set according to the sampling time period corresponding to the sample set.

In step S303, multiple sample sets sampled according to sampling rates are acquired.

In step S304, importance values of the multiple sampled sample sets are determined respectively.

In step S305, pieces of sample data in the multiple sampled sample sets are corrected by using the importance values to obtain corrected sample data.

The above steps S301 to S305 may be identical or similar to steps S101 to S105 or steps S201 to S205 described above, and are not repeated in detail here.

As shown in FIG. 3, these embodiments may further include the following step.

In step S306, each piece of the corrected sample data is input into the machine learning system to train the machine learning system. In this step, the corrected sample data may be input into the machine learning system to train the machine learning system. During training, the derivative of a loss function is taken to calculate a gradient, and a weight close to the optimal solution may be calculated through iteration based on the gradient, an initial weight, and a set step length according to the formula "new weight=old weight+step length*gradient."

This step may include sub-steps S306a-S306c as follows.

In sub-step S306a, a gradient of each piece of the corrected sample data is calculated. The gradient of each piece of corrected sample data may be calculated. The gradient may be the derivative of a loss function, and the gradient may be obtained by taking the derivative of the loss function.

In sub-step S306b, a precision of the gradient of each piece of the sample data is reduced.

In this sub-step, the machine learning system is generally trained by using a gradient descent method, and a gradient of each machine needs to be calculated. If 8 bytes are required to store 1 gradient, a storage space of 10,000,000,000*8/1024/1024/1024=74.5 GB is needed for storing 10 billion gradients. If the number of bytes for storing one gradient is compressed to 4 bytes, a memory of 32.25 GB is needed for storing 10 billion gradients.

The number of bytes for storing the gradient of each piece of sample data may be reduced by using the following formula to reduce the precision:

$$X1 = \text{floor}(c*X+(\text{rand}(\ ))/d)/c;$$

wherein floor is rounded down; rand( ) is to generate a floating number between 0-d; X1 is a low-precision floating number, for example, a 4-byte float to be stored by the computer, which can represent bytes for storing the gradient of each piece of the sample data after reduction; and X is a high-precision floating number, for example, a 8-byte double to be stored by the computer, which can represent bytes for storing the gradient of each piece of the sample data before reduction.

In addition, a rand function is used to introduce a random factor to reduce a cumulative error of the floating number. For example, an algorithm of (c*X+(rand( ))/d) is utilized, wherein X is multiplied by a fixed number c and is added with a floating number in a range of 0-1 to introduce a random factor. The value of c is an empirical value, such as 536,870,912. The value of d may be, for example, $2^{31}-1$, i.e., 2,147,483,647, which is an upper limit that can be generated by the rand function.

By using the foregoing formula, a high-precision floating number may be converted to a low-precision floating number, and the cumulative error may be reduced.

In sub-step S306c, gradients having precisions that have been reduced are input into the machine learning system to train the machine learning system.

In summary, these embodiments of the present disclosure as exemplified in FIG. 3 disclose a method for training a machine learning system. The sample data is processed before being input into the machine learning system. Importance values of different sample sets are set, and the gradient precision is reduced. Therefore, the adoption rate and the utilization of important data can be improved while the data amount is reduced. The impact on the learning performance of the machine learning system can be reduced while the demand for memory resources is lessened.

Figure 4:
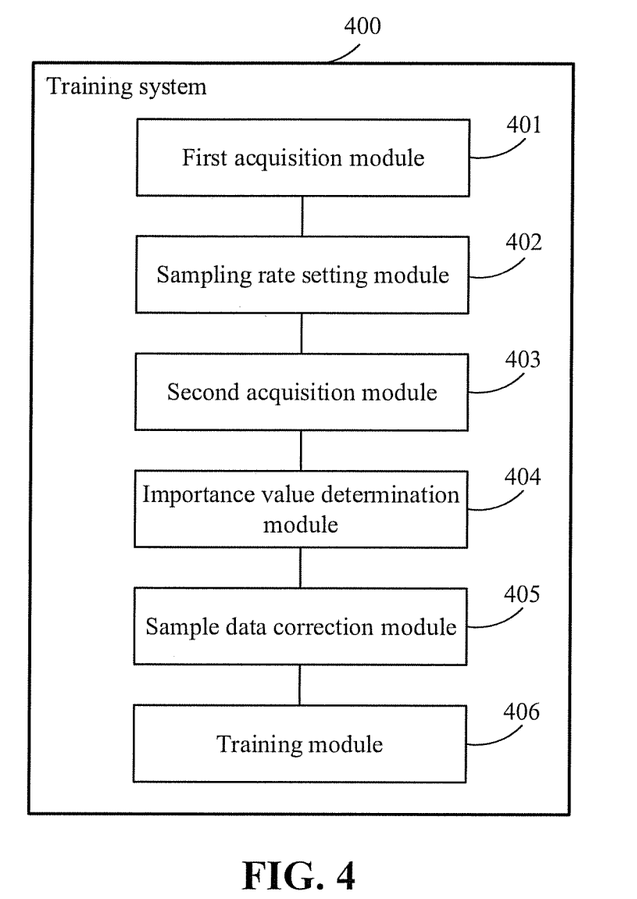
FIG. 4 is a block diagram of an exemplary system for training a machine learning system according to some embodiments of the present disclosure.

According some embodiments of the present disclosure, there is provided a system for training a machine learning system. FIG. 4 shows a block diagram of an exemplary system for training a machine learning system according to some embodiments of the present disclosure. The system for training a machine learning system provided in these embodiments trains the machine learning system by using multiple pieces of sample data. As shown in FIG. 4, embodiments of the present disclosure provide a training system 400. Training system 400 can include a first acquisition module 401 configured to acquire multiple sample sets. Each sample set includes sample data corresponding to a sampling time period. Training system 400 can include a sampling rate setting module 402 configured to set a sampling rate for a sample set according to the sampling time period corresponding to the sample set. Training system 400 can include a second acquisition module 403 configured to acquire multiple sample sets sampled according to sampling rates. Training system 400 can include an importance value determination module 404 configured to respectively set importance values of the multiple sampled sample sets. Training system 400 can include a sample data correction module 405 configured to correct each piece of sample data in the multiple sampled sample sets by using its corresponding importance value to obtain corrected sample data. Training system 400 can include a training module 406 configured to input each piece of the corrected sample data into the machine learning system to train the machine learning system.

In these embodiments, the sampling rate is set higher for a sample set corresponding to a later sampling time period than the sampling rate of a sample set corresponding to an earlier sampling time period.

In summary, these embodiments of the present disclosure disclose a system for training a machine learning system. The sample data is processed before being input into the machine learning system. The adoption rate and the utilization of important data can be improved while the data amount is reduced. Thus, the impact on the learning performance of the machine learning system can be reduced while the demand for memory resources is lessened.

Figure 5:
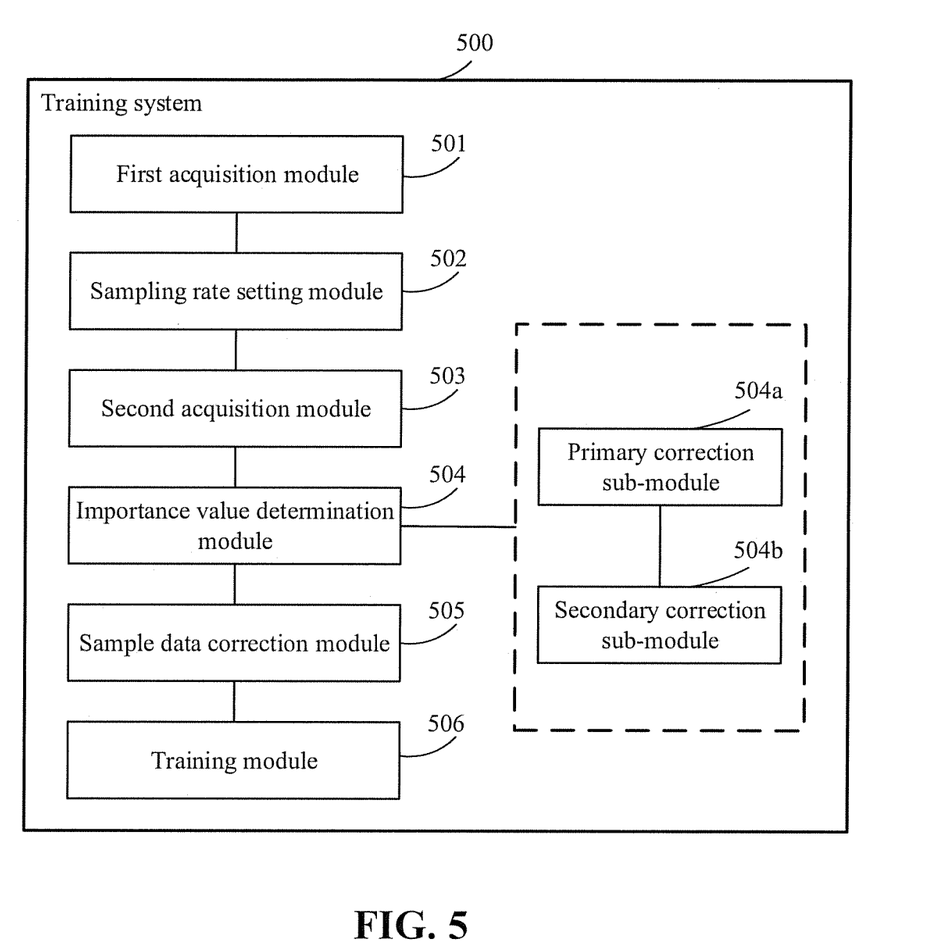
FIG. 5 is a block diagram of an exemplary system for training a machine learning system according to some embodiments of the present disclosure.

According to some embodiments of the present disclosure, there is provided another system for training a machine learning system. FIG. 5 shows a block diagram of an exemplary system for training a machine learning system according to some embodiments of the present disclosure. The system for training a machine learning system provided in these embodiments trains the machine learning system by using multiple pieces of sample data. As shown in FIG. 5, embodiments of the present disclosure provide a training system 500. Training system 500 can include a first acquisition module 501 configured to acquire multiple sample sets. Each sample set includes sample data corresponding to a sampling time period. Training system 500 can include a sampling rate setting module 502 configured to set a sampling rate for a sample set according to the sampling time period corresponding to the sample set. Training system 500 can include a second acquisition module 503 configured to acquire multiple sample sets sampled according to sampling rates. Training system 500 can include an importance value determination module 504 configured to respectively set importance values of the multiple sampled sample sets. Training system 500 can include a sample data correction module 505 configured to correct each piece of sample data in the multiple sampled sample sets by using its corresponding importance value to obtain corrected sample data. Training system 500 can include a training module 506 configured to input each piece of the corrected sample data into the machine learning system to train the machine learning system.

In these embodiments, sample data correction module 505 can be configured to multiply each of the importance values by each piece of sample data in a sampled sample set corresponding to the importance value to obtain corrected sample data.

In these embodiments, importance value determination module 504 can include a primary correction sub-module 504a configured to correct initial importance values of the sampled sample sets based on corresponding sampling rates to obtain corrected or modified importance values of the sampled sample sets. A corrected or modified importance value can be directly proportional to its corresponding initial importance value, and inversely proportional to the sampling rate of the sampled sample set.

For example, the primary correction sub-module may set an importance value of each sample set primarily according to the following formula:

$Y1=Y/a;$ wherein Y1 is a set importance value corresponding to the sample set; Y is an original importance value set corresponding to the sample set; and a is a sampling rate of the sample set.

In these embodiments, importance value determination module 504 may further include a secondary correction sub-module 504b configured to increase the importance value of the sample set corresponding to the latest sampling time period according to a preset rule.

The preset rule can include increasing the importance value of the sample set corresponding to the latest sampling time period so that it can be directly proportional to the importance value of the sample set corresponding to the latest sampling time period before increase and directly proportional to the total number of the sample sets.

For example, the importance value of the sample set corresponding to the latest sampling time period may be re-set according to the following formula:

$Z1=Z*b;$ wherein Z1 is a re-set importance value set corresponding to the sample set; Z is an initially set importance value corresponding to the sample set; and b is the total number of the sample sets.

In these embodiments, the sampling rate is set higher for a sample set corresponding to a later sampling time period than the sampling rate of a sample set corresponding to an earlier sampling time period.

In summary, these embodiments of the present disclosure disclose a system for training a machine learning system. The sample data is processed before being input into the machine learning system, and importance values of different sample sets are set. Therefore, the adoption rate and the utilization of important data can be improved while the data amount is reduced. The impact on the learning performance of the machine learning system can be reduced while the demand for memory resources is lessened.

Figure 6:
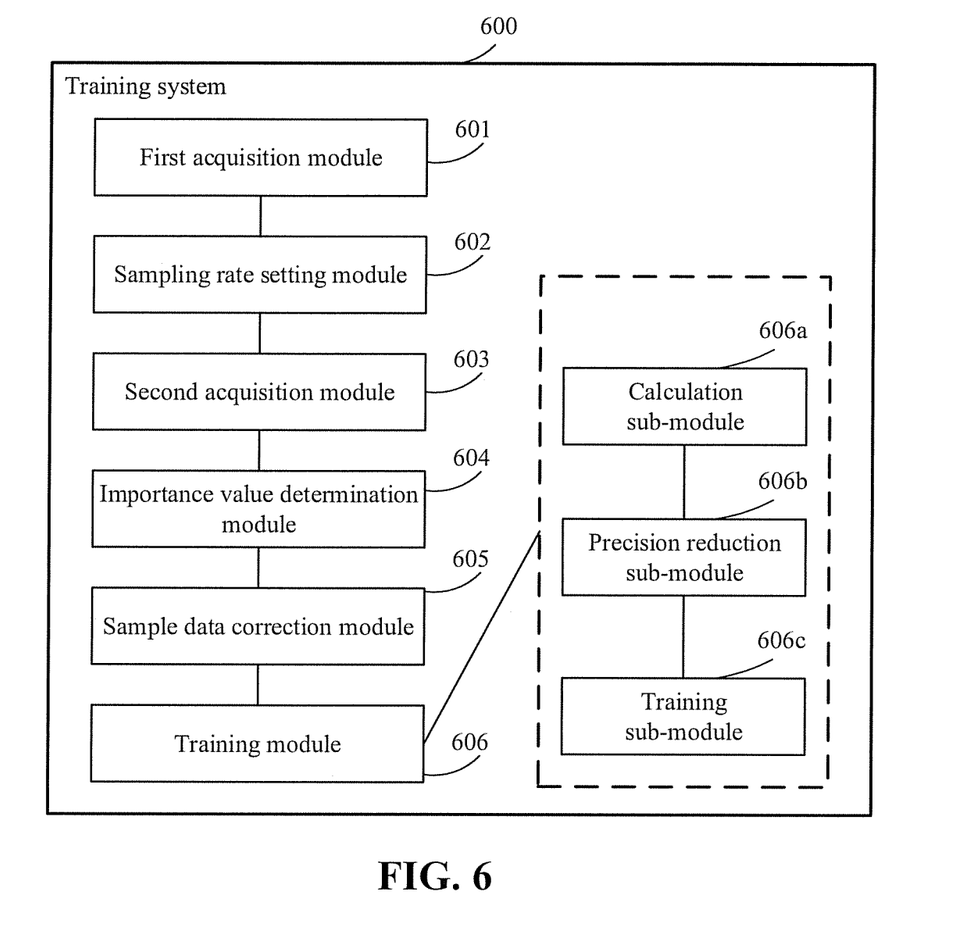
FIG. 6 is a block diagram of an exemplary system for training a machine learning system according to some embodiments of the present disclosure.

According to some embodiments of the present disclosure, there is provided yet another system for training a machine learning system. FIG. 6 shows a block diagram of an exemplary system for training a machine learning system according to some embodiments of the present disclosure. The system for training a machine learning system provided in these embodiments trains the machine learning system by using multiple pieces of sample data. As shown in FIG. 6, embodiments of the present disclosure provide a training system 600. Training system 600 can include a first acquisition module 601 configured to acquire multiple sample sets. Each sample set includes sample data corresponding to a sampling time period. Training system 600 can include a sampling rate setting module 602 configured to set a sampling rate for a sample set according to the sampling time period corresponding to the sample set. Training system 600 can include a second acquisition module 603 configured to acquire multiple sample sets sampled according to sampling rates. Training system 600 can include an importance value determination module 604 configured to respectively set importance values of the multiple sampled sample sets. Training system 600 can include a sample data correction module 605 configured to correct each piece of sample data in the multiple sampled sample sets by using its corresponding importance value to obtain corrected sample data. Training system 600 can include a training module 606 configured to input each piece of the corrected sample data into the machine learning system to train the machine learning system.

In these embodiments, training module 606 can include a calculation sub-module 606a configured to calculate a gradient of each piece of the corrected sample data. Training module 606 can include a precision reduction sub-module 606b configured to reduce the precision of each of the gradients. Training module 606 can include a training submodule 606c configured to input the gradients having precisions that have been reduced into the machine learning system to train the machine learning system.

In these embodiments, precision reduction sub-module 606b can be configured to reduce bytes for storing each gradient by using the following formula to reduce the precision:

$$X1=\text{floor}(c*X+\text{rand}(\ ))/d)/c$$

wherein floor is rounded down; rand ( ) is to generate a floating number between 0-d; X1 is the number of bytes for storage after reduction; and X is the number of bytes for storage before reduction.

In summary, these embodiments of the present disclosure disclose a system for training a machine learning system. The sample data is processed before being input into the machine learning system. Importance values of different sample sets are set, and the gradient precision is reduced. Therefore, the adoption rate and the utilization of important data can be guaranteed while the data amount is reduced. The impact on the learning performance of the machine learning system can be reduced while the demand for memory resources is lessened.

The apparatus embodiments provide functionality that is basically similar to the functionality provided by the method embodiments, so that they are described briefly. Reference may be made to the descriptions of the relevant parts in the method embodiments.

The embodiments of this disclosure are all described in a progressive manner. Each embodiment emphasizes a difference from other embodiments, and identical or similar parts in the embodiments may be obtained from each other.

Those skilled in the art should understand that the embodiments of the present disclosure may be provided as a method, an apparatus, or a computer program product. Therefore, the embodiments of the present disclosure may be implemented as a complete hardware embodiment, a complete software embodiment, or an embodiment combining software and hardware. Moreover, the embodiments of the present disclosure may be a computer program product implemented on one or more computer usable storage media (including, but not limited to, a magnetic disk memory, a CD-ROM, an optical memory, and the like) including computer usable program codes.

In a typical configuration, the computer device includes one or more processors (CPU), an input/output interface, a network interface, and a memory. The memory may include a volatile memory, a random access memory (RAM) and/or a non-volatile memory or the like in a computer readable medium, for example, a read only memory (ROM) or a flash RAM. The memory is an example of the computer readable medium. The computer readable medium includes non-volatile and volatile media as well as movable and non-movable media, and can implement information storage by means of any method or technology. A storage medium of a computer includes, but is not limited to, for example, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read only memory (CD-ROM), a digital versatile disc (DVD) or other optical storages, a cassette tape, a magnetic tape/magnetic disk storage or other magnetic storage devices, or any other non-transmission medium, and can be used to store signals accessible to the computing device. According to the definition of this text, the computer readable medium does not include transitory media, such as a modulated data signal and a carrier.

The embodiments of the present disclosure are described with reference to flowcharts and/or block diagrams according to the method, terminal device (system) and computer program product according to the embodiments of the present disclosure. It should be understood that a computer program instruction may be used to implement each process and/or block in the flowcharts and/or block diagrams and combinations of processes and/or blocks in the flowcharts and/or block diagrams. The computer program instructions may be provided to a computer, an embedded processor, or another programmable data processing terminal device to generate a machine, such that the computer or a processor of another programmable data processing terminal device executes an instruction to generate an apparatus configured to implement functions designated in one or more processes in a flowchart and/or one or more blocks in a block diagram.

The computer program instructions may also be stored in a computer readable storage capable of guiding a computer or another programmable data processing terminal device to work in a specific manner, such that the instructions stored in the computer readable storage generates an article of manufacture including an instruction apparatus, and the instruction apparatus implements functions designated by one or more processes in a flowchart and/or one or more blocks in a block diagram.

The computer program instructions may also be loaded in a computer or another programmable data processing terminal device, such that a series of operation steps are executed on the computer or another programmable terminal device to generate a computer implemented processing. Therefore, the instructions executed on the computer or another programmable terminal device provides steps for implementing functions designated in one or more processes in a flowchart and/or one or more blocks in a block diagram.

Embodiments of the present disclosure have been described; however, once knowing the basic creative concepts, those skilled in the art can make other variations and modifications to the embodiments. Therefore, the appended claims are intended to be explained as including the embodiments described herein and all variations and modifications falling within the scope of the embodiments of the present disclosure.

Finally, it should be further noted that the relation terms in this text such as "first" and "second" are merely used to distinguish one entity or operation from another entity or operation, and do not require or imply that the entities or operations have this actual relation or order. Moreover, the term "include," "comprise" or other variations thereof is intended to cover non-exclusive inclusion, so that a process, method, article or terminal device including a series of elements not only includes the elements, but also includes other elements not clearly listed, or further includes inherent elements of the process, method, article or terminal device. In the absence of more limitations, an element defined by "including a(n) . . . " does not exclude that the process, method, article or terminal device including the element further has other identical elements.

The above descriptions of the embodiments are merely used to help understand the methods and systems of the present disclosure and its core ideas. Meanwhile, for those of ordinary skill in the art, there may be modifications to the specific implementation manners and application scopes according to the idea of the present disclosure. Therefore, the content of the specification should not be construed as limiting the present disclosure.

The invention claimed is:

1. A method for training a machine learning system using multiple pieces of sample data, the method comprising:
   acquiring multiple sample sets, each sample set of the multiple sample sets comprising sample data in a corresponding sampling time period;
   setting a sampling rate for each sample set according to the corresponding sampling time period;
   acquiring multiple sample sets sampled according to set sampling rates;
   determining importance values of the multiple sampled sample sets;
   correcting each piece of sample data in the multiple sampled sample sets by using a corresponding importance value to obtain corrected sample data; and
   inputting each piece of the corrected sample data into the machine learning system to train the machine learning system, comprising:
      determining a gradient of each piece of the corrected sample data;
      reducing a precision of each of the gradients, comprising:
         reducing bytes for storing each gradient based on the following formula to reduce the precision:

$X1 = \text{floor}(c*X+(\text{rand}(\ ))/d)/c,$ wherein floor is rounded down; rand ( ) is to generate a floating number between 0-d; X1 is the number of bytes for storage after reduction; and X is the number of bytes for storage before reduction; and
      inputting the gradients having reduced precisions into the machine learning system to train the machine learning system.

2. The method according to claim 1, wherein correcting each piece of sample data in the multiple sampled sample sets comprises:
   multiplying each of the importance values by each piece of sample data in the sampled sample set corresponding to each importance value to obtain corrected sample data.

3. The method according to claim 1, wherein determining the importance values of the multiple sampled sample sets comprises:
   correcting initial importance values of the sampled sample sets based on the sampling rates corresponding to the sampled sample sets to obtain corrected importance values of the sampled sample sets,
   wherein, for each sampled sample set, the corrected importance value is proportional to the initial importance value, and is inversely proportional to the sampling rate of the sampled sample set.

4. The method according to claim 3, wherein correcting the initial importance values of the sampled sample sets further comprises:
   increasing the initial importance value of the sample set corresponding to a latest sampling time period according to a preset rule.

5. The method according to claim 4, wherein the preset rule comprises:
   the initial importance value of the sample set corresponding to the latest sampling time period is increased, such that the increased importance value is proportional to the initial importance value of the sample set corresponding to the latest sampling time period and is proportional to the total number of the sample sets.

6. The method according to claim 1, wherein setting the sampling rate for each sample set comprises:
   setting the sampling rate of a sample set corresponding to a later sampling time period higher than the sampling rate of a sample set corresponding to an earlier sampling time period.

7. A system for training a machine learning system using multiple pieces of sample data, the system comprising:
   one or more memories configured to store executable program code; and
   one or more processors configured to read the executable program code stored in the one or more memories to cause the system to perform:
      acquiring multiple sample sets, each sample set of the multiple sample sets comprising sample data in a corresponding sampling time period;
      setting a sampling rate for each sample set according to the corresponding sampling time period;
      acquiring multiple sample sets sampled according to set sampling rates;
      determining importance values of the multiple sampled sample sets;
      correcting each piece of sample data in the multiple sampled sample sets by using a corresponding importance value to obtain corrected sample data; and
      inputting each piece of the corrected sample data into the machine learning system to train the machine learning system, comprising:
         determining a gradient of each piece of the corrected sample data;
         reducing a precision of each of the gradients, comprising:
            reducing bytes for storing each gradient based on the following formula to reduce the precision:

$X1 = \text{floor}(c*X+(\text{rand}(\ ))/d)/c,$ wherein floor is rounded down; rand( ) is to generate a floating number between 0-d; X1 is the number of bytes for storage after reduction; and X is the number of bytes for storage before reduction; and
         inputting the gradients having reduced precisions into the machine learning system to train the machine learning system.

8. The system according to claim 7, wherein the one or more processors are configured to read the executable program code to cause the system to perform the following to correct each piece of sample data in the multiple sampled sample sets:
   multiplying each of the importance values by each piece of sample data in the sampled sample set corresponding to each importance value to obtain corrected sample data.

9. The system according to claim 7, wherein the one or more processors are configured to read the executable program code to cause the system to perform the following to determine the importance values of the multiple sampled sample sets:
   correcting initial importance values of the sampled sample sets based on the sampling rates corresponding to the sampled sample sets to obtain corrected importance values of the sampled sample sets,
   wherein, for each sampled sample set, the corrected importance value is proportional to the initial importance value, and is inversely proportional to the sampling rate of the sampled sample set.

10. The system according to claim 9, wherein the one or more processors are configured to read the executable program code to cause the system to further perform the following to determine the importance values of the multiple sampled sample sets:
increasing the initial importance value of the sample set corresponding to a latest sampling time period according to a preset rule.

11. The method according to claim 10, wherein the preset rule comprises:
the initial importance value of the sample set corresponding to the latest sampling time period is increased, such that the increased importance value is proportional to the initial importance value of the sample set corresponding to the latest sampling time period and is proportional to the total number of the sample sets.

12. The system according to claim 7, wherein the one or more processors are configured to read the executable program code to cause the system to perform the following to set the sampling rate for each sample set:
setting the sampling rate of a sample set corresponding to a later sampling time period higher than the sampling rate of a sample set corresponding to an earlier sampling time period.

13. A non-transitory computer-readable storage medium storing a set of instructions that is executable by one or more processors of an electronic device to cause the electronic device to perform a method comprising:
acquiring multiple sample sets, each sample set of the multiple sample sets comprising sample data in a corresponding sampling time period;
setting a sampling rate for each sample set according to the corresponding sampling time period;
acquiring multiple sample sets sampled according to set sampling rates;
determining importance values of the multiple sampled sample sets;
correcting each piece of sample data in the multiple sampled sample sets by using a corresponding importance value to obtain corrected sample data; and
inputting each piece of the corrected sample data into the machine learning system to train the machine learning system, comprising:
determining a gradient of each piece of the corrected sample data;
reducing a precision of each of the gradients, comprising:
reducing bytes for storing each gradient based on the following formula to reduce the precision:

$X1 = \text{floor}(c*X+(\text{rand}(\ ))/d)/c,$ wherein floor is rounded down; rand( ) is to generate a floating number between 0-d; X1 is the number of bytes for storage after reduction; and X is the number of bytes for storage before reduction; and
inputting the gradients having reduced precisions into the machine learning system to train the machine learning system.

14. The non-transitory computer-readable storage medium of claim 13, wherein the set of instructions that is executable by the one or more processors of the electronic device causes the electronic device to perform the following to correct each piece of sample data in the multiple sampled sample sets:
multiplying each of the importance values by each piece of sample data in the sampled sample set corresponding to each importance value to obtain corrected sample data.

15. The non-transitory computer-readable storage medium of claim 13, wherein the set of instructions that is executable by the one or more processors of the electronic device causes the electronic device to perform the following to determine the importance values of the multiple sampled sample sets:
correcting initial importance values of the sampled sample sets based on the sampling rates corresponding to the sampled sample sets to obtain corrected importance values of the sampled sample sets,
wherein, for each sampled sample set, the corrected importance value is proportional to the initial importance value, and is inversely proportional to the sampling rate of the sampled sample set.

16. The non-transitory computer-readable storage medium of claim 15, wherein the set of instructions that is executable by the one or more processors of the electronic device causes the electronic device to further perform the following to determine the importance values of the multiple sampled sample sets:
increasing the initial importance value of the sample set corresponding to a latest sampling time period according to a preset rule.

17. The non-transitory computer-readable storage medium of claim 16, wherein the preset rule comprises:
the initial importance value of the sample set corresponding to the latest sampling time period is increased, such that the increased importance value is proportional to the initial importance value of the sample set corresponding to the latest sampling time period and is proportional to the total number of the sample sets.

18. The non-transitory computer-readable storage medium of claim 13, wherein the set of instructions that is executable by the one or more processors of the electronic device causes the electronic device to perform the following to set the sampling rate for each sample set:
setting the sampling rate of a sample set corresponding to a later sampling time period higher than the sampling rate of a sample set corresponding to an earlier sampling time period.

* * * * *